United States Patent [19]

Ragsdale

[11] Patent Number: 4,577,194
[45] Date of Patent: Mar. 18, 1986

[54] AREA NAVIGATIONAL SYSTEM

[75] Inventor: William A. Ragsdale, League City, Tex.

[73] Assignee: Intermetrics, Inc., Cambridge, Mass.

[21] Appl. No.: 504,262

[22] Filed: Jun. 14, 1983

[51] Int. Cl.$^4$ .............................................. G01S 1/44
[52] U.S. Cl. .................................. 343/401; 364/458; 364/448
[58] Field of Search ....................... 343/401, 400, 398; 364/444, 448, 450, 458

[56] References Cited

U.S. PATENT DOCUMENTS 2,560,527 7/1951 Dehmel ................................ 364/458

OTHER PUBLICATIONS

Collins, DCE-400 Micro-Line Distance Computing Equipment.
Klass, Aviation Week & Space Technology; 9/18/78, pp. 63-66.

Primary Examiner—Theodore M. Blum
Assistant Examiner—Gregory Issing
Attorney, Agent, or Firm—John W. Freeman

[57] ABSTRACT

Apparatus for air navigation to a point of known location which is separated from a VOR beacon of known location. The apparatus comprises storage means for storing signals representative of, respectively, the known locations of said point and said VOR, an estimated ground speed, an estimated range-to-go to said point, and an estimated course to said point, means for receiving from a VOR signal receiver/VOR bearing generator a signal representative of the current bearing of said VOR beacon, a bearing change generator for generating a signal that is representative of the change in the VOR bearing, a course estimator for generating a signal representative of an updated course heading, a range-to-point estimator for generating a signal representative of the range-to-point, and control means for controlling the bearing sampling and for activating the course estimator at predetermined intervals.

19 Claims, 11 Drawing Figures

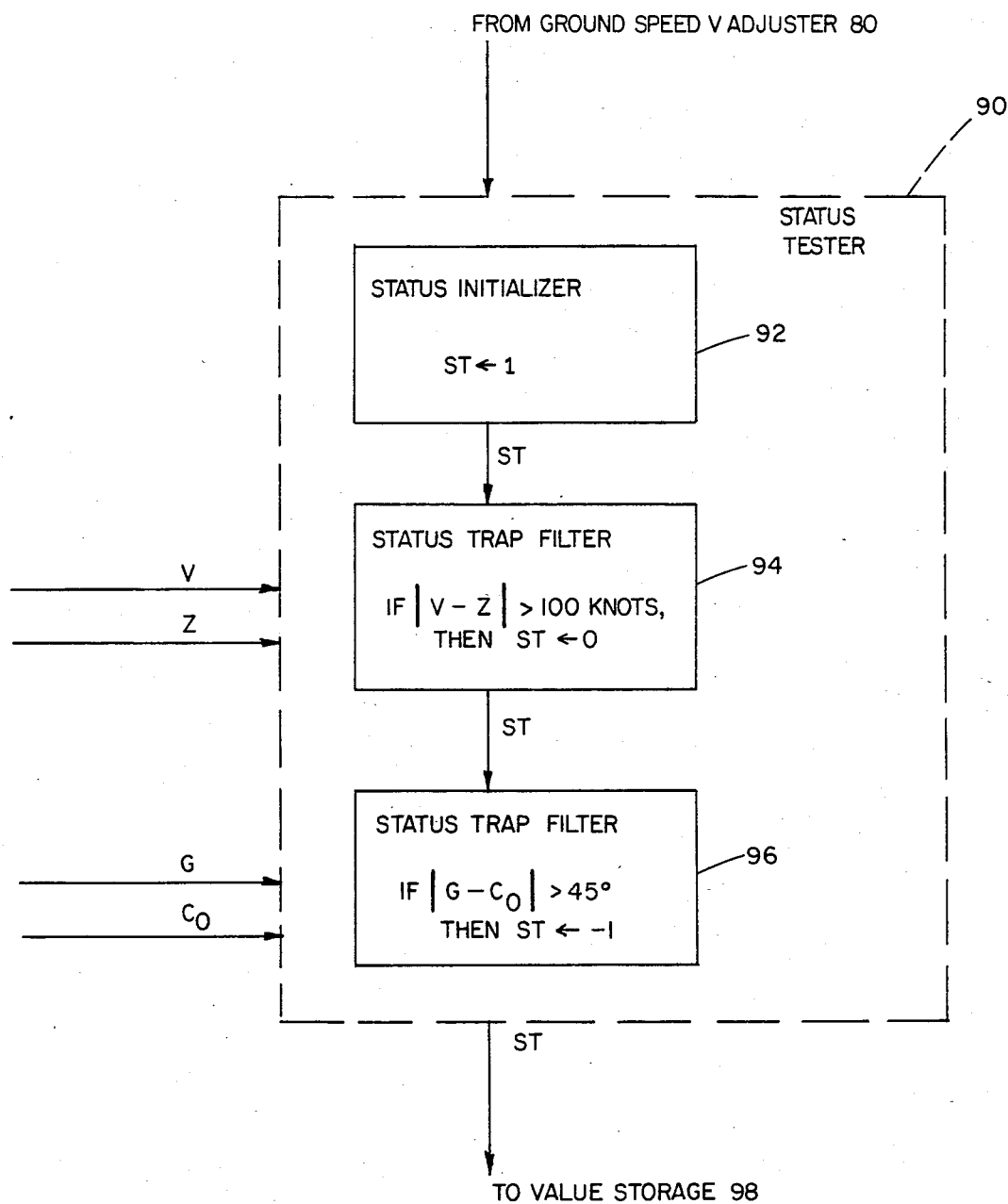

AREA NAVIGATIONAL SYSTEM

BACKGROUND OF THE INVENTION

Aircraft navigation systems often include receivers for beacon signals which provide directional information in flight. For example, nearly every civilian aircraft has at least one receiver for a common type of navigation beacon, called a VHF Omni Range (VOR) beacon, which transmits signals that provide information about the aircraft's bearing with respect to the transmitting beacon. Flight paths between two points are plotted in light of VOR beacon locations. The overall flight path from destination to arrival may comprise several flight-path segments between waypoints, and it may pass through the effective range of several navigation beacons.

There are a number of methods used to plot flight paths between selected points. In one such method, the aircraft simply flys from one VOR beacon toward the next beacon generally along its overall flight path. This kind of navigation produces a zigzagging flight path between beginning and end points, which wastes both time and fuel. Crowding problems may occur around major airports if a large number of aircraft are flying toward the same beacon. Also, small airports typically are located away from the VOR beacons, making navigation to them difficult.

Area navigation is a navigational system that permits a pilot to fly directly between any two arbitrary waypoints, thus freeing him from the requirement of flying along courses between VOR beacons and avoiding the problems discussed above. To use area navigation, one must know the aircraft's present flight position with respect to the desired waypoint. If the bearings and ranges between the aircraft and a nearby VOR, and between the VOR and waypoint, are known, the course and range to the waypoint then can be determined using simple navigational triangles (the law of sines).

Generally the bearing and range between a VOR and a preselected waypoint may be determined from navigational maps. The VOR equipment on board can be used to estimate the bearing from the plane to the nearby VOR.

Determining the range from the plane to the VOR is more difficult. Larger aircraft have relatively expensive distance measuring equipment (DME) to determine the distance between the aircraft and a given VOR. DME sends a signal to a DME receiver at the VOR beacon, which sends a return signal to the aircraft. The aircraft DME measures the echo time, from which the aircraft's distance to the beacon may be derived. Once the aircraft-to-beacon bearing and range are known, the plane's course and range to the desired waypoint may be derived.

DME is relatively expensive, and is out of the reach of many small aircraft users. Also, it is an "active" system, requiring action on the part of equipment at the beacon. Therefore, if a large number of aircraft are using DME, they have to wait for service at crowded beacons such as those located near large airports.

Another method of calculating the course and range to a waypoint is to track the aircraft's bearing with respect to two VOR beacons and find the point where the two lines intersect. This method requires two VOR receivers and extensive calculations; and is of little value if the aircraft is not continually within range of two VOR beacons. (A beacon's range is about 50 nautical miles for aircraft at 2500 feet.)

Yet another method is to compare the aircraft speed to the rate of change of the aircraft's bearing with respect to a VOR beacon off of the aircraft wingtip. This again requires complex calculations, making recovery difficult once lost.

Finally, there is apparatus (such as the DCE 400 marketed by Collins) which requires navigation directly toward a first VOR beacon and calculates the range to that beacon using a second VOR signal beacon.

SUMMARY OF THE INVENTION

I have discovered suitable filtering and other navigational apparatus which makes reliable area navigation possible, even when the aircraft is within range of only one VOR beacon signal and has no equipment for directly measuring the distance to the VOR. The apparatus continually updates the estimated course or range to an arbitarary waypoint using an estimated range to the VOR. Reliability of that VOR range estimate is attained by apparatus with an evaluation filter that is independent of the reliability of the current course heading; the filter is applied to a range estimate which does not depend on the accuracy of the estimate of the aircraft's ground speed.

Specific features of that apparatus are: a first provisional range-to-VOR generator for deriving a provisional range-to-VOR from the current estimated course heading and the current bearing to VOR; a second provisional range-to-VOR generator for deriving a provisional range to VOR from the current estimated ground speed and the change in the bearing to the VOR; a range filter for selecting one of said two provisional ranges-to-VOR; a means for estimating either the course or the heading to the desired waypoint using the selected provisional range-to-VOR.

In preferred embodiments, the updates are performed at intervals of between one second and two minutes. The first provisional VOR range estimate is used unless the filter determines that the first and second provisional estimates are not sufficiently close according to a predetermined test; in that case the second provisional estimate is used. The apparatus also includes a range-to-waypoint and ground speed updater which uses the filtered updated course information. Other filters in the apparatus include a heading filter for the heading update and a filter for the ground speed update. The apparatus may be connected to an automatic pilot and compass so that it directs the automatic pilot to follow the updated course.

The apparatus is simple, relatively inexpensive, and reliable, thus being particularly suited for small-aircraft applications. The apparatus is also suited for applications which require a passive system (i.e., where the aircraft does not transmit an identifying signal), such as for military aircraft and as a guidance system for incoming missiles.

Other features and advantages of the invention will be apparent from the following description of the preferred embodiment and from the claims.

DESCRIPTION OF THE PREFERRED EMBODIMENT

I turn first to a brief description of the drawings.

I. Drawings

FIGS. 6–11 show portions of FIG. 5 in more detail, in particular:

FIG. 6 shows the interval timing and range W estimator 1;

FIG. 7 shows the system's bearing sampler and range W estimator 2;

FIG. 8 shows the range R estimator;

FIG. 9 shows the course C estimator and range W estimator 3;

FIG. 10 shows the ground speed V adjustor;

FIG. 11 shows the status tester.

II. Apparatus

Figure 1:
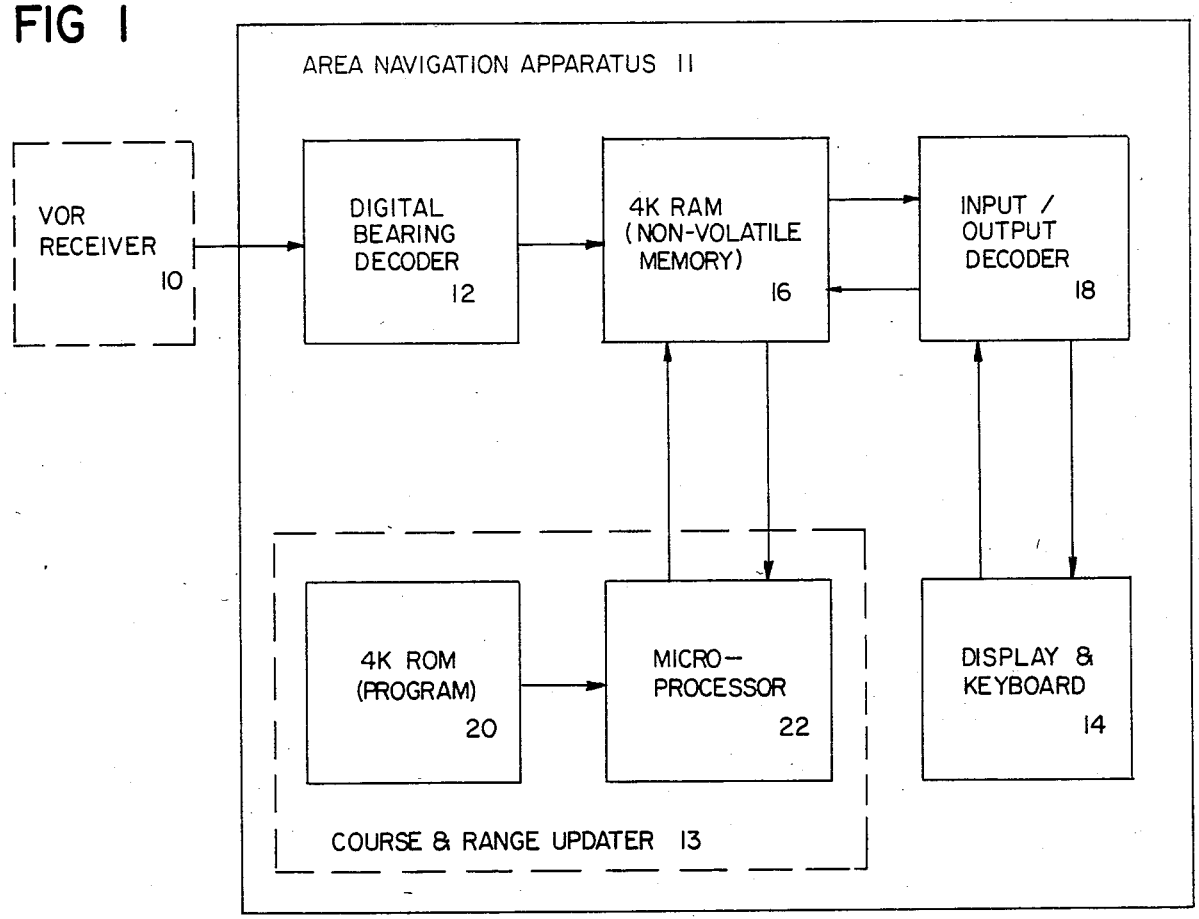
FIG. 1 is a diagram of the hardware components for the present invention.

In FIG. 1 is shown an area navigation apparatus 11 for connection in an aircraft to VOR receiver 10. Apparatus 11 includes a display and keyboard 14 (FIG. 2, described below) which is connected to 4K RAM 16 through I/O decoder 18. Course and range updater 13, which includes a 4K ROM 20 having a stored program that operates through microprocessor 22, is also connected to RAM 16. The elements of updater 13 are shown in greater detail in FIG. 5, which is described below. VOR signal receiver 10 provides reference and variable phase 30 Hz signals to a digital bearing decoder 12 which in turn provides a digital VOR beacon bearing to RAM 16.

Figure 2:
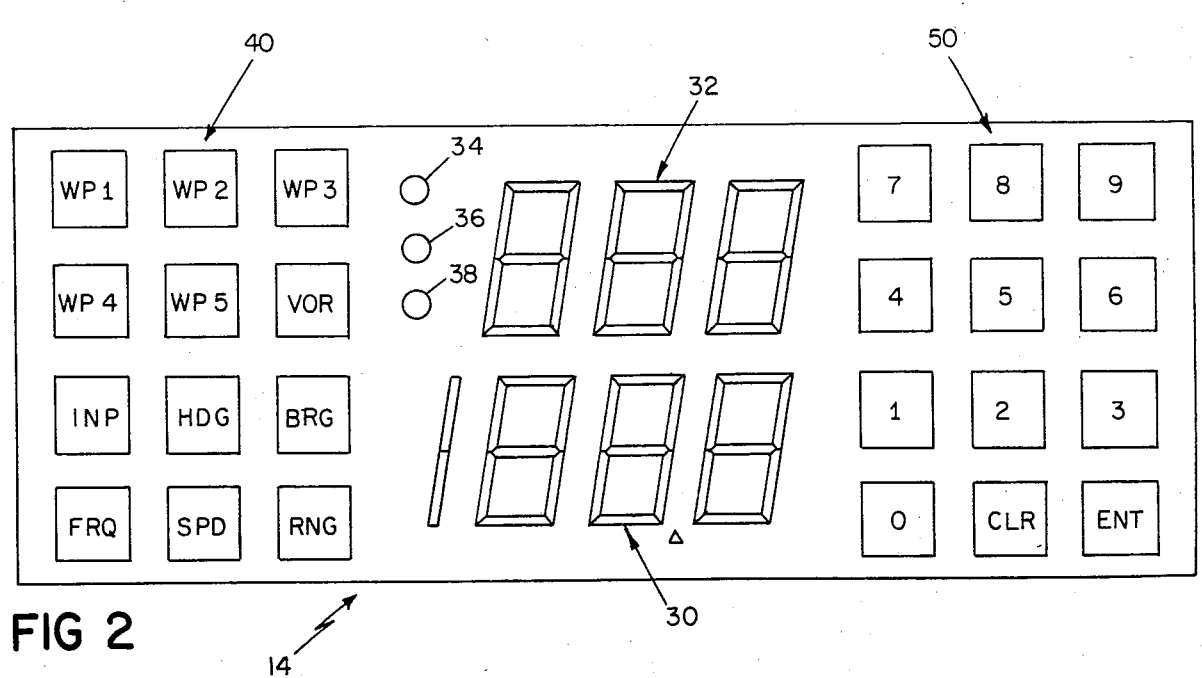
FIG. 2 is a diagram of the display and keyboard for the present invention.

As shown in FIG. 2, display and keyboard 14 consists of two digital LED displays 30, 32, status lights 34, 36, 38, a panel 40 of pushbutton indicators, and a calculator-type keypad 50.

Each of the pushbutton indicators on panel 40 has a light underneath so that LED output may be identified. The top six pushbutton indicators, WP1–WP5 and VOR, identify which of five waypoints or VOR is being shown in digital displays 30,32. The lower six pushbutton indicators identify the quantities being displayed on displays 30, 32. LED display 32 shows angular information for either actual aircraft course (HDG) or Bearing (BRG) when the corresponding button on panel 40 is depressed. LED display 30 shows either VOR Frequency (FRQ), Speed (SPD), or Range (RNG) to either the VOR or to the waypoint indicated on panel 40 when the corresponding button on panel 40 is depressed.

A lighted input pushbutton indicator (INP) on panel 40 indicates that the system will accept input. When the INP light is off, the apparatus outputs data for display.

Keypad 50 has ten data keys and buttons, with which data are entered in the same manner as in calculators. The Clear Entry pushbutton (CLR) clears the entry to correct for errors. Pressing the Enter pushbutton (ENT) allows the system to store the inputted value into RAM 16.

III. Operation

A. Loading Information

One loading and operating sequence is as follows. Area navigation apparatus 11 is turned on whenever the VOR receiver 10 is powered on. One of the status lights 34, 36, 38 on display and keyboard 14 are illuminated to indicate the navigation unit is on, and the values in displays 30, 32 initially depend on information remaining in RAM 16 after past usage. When the INP button on panel 40 is pushed, and thus illuminated, apparatus 11 is ready to accept input data for as many as five waypoints along the desired flightpath.

For each waypoint, the area navigation system requires the frequency (FRQ) of a VOR near the waypoint, the bearing (BRG) and range (RNG) from the VOR to the waypoint, estimated heading (HDG) from starting position to the waypoint, and estimated speed (SPD) of the aircraft.

To load data for the first waypoint of the trip, WP1 is pushed. When its light appears, the appropriate VOR frequency for WP1 is entered by pushing FRQ and entering the frequency through keypad 50. The entered frequency value appears on LED display 30, and FRQ and WP1 buttons remain lit. Bearing from VOR to WP1 is inputted by pushing the BRG button, thus causing it to be illuminated. The appropriate bearing value (in degrees) is entered through keypad 50. At this point the WP1, INP, FRQ, and BRG buttons are lit, the Red Status light 34 is on, and displays 30, 32 show respectively the entered frequency and bearing. Heading to WP1 is inputted with the HDG button in the same manner as is bearing; the HDG light then replaces the BRG light.

The range from VOR to WP1 is inputted by pushing RNG. Range is entered through the keypad 50 in tenths of a nautical mile. For example, if 12.3 miles is the range to be entered, "1 2 3 ENT" is input through keypad 50 so that "12.3" is displayed on LED display 30, while the WP1, INP, RNG, and BRG buttons remain lit. Speed is entered with the SPD button in the same manner as is range, however, speed is entered through keypad 50 in knots.

At this point, all of the WP1 data has been inputted. For WP2 or any other waypoint, the above inputting process is repeated. If more than five waypoints are desired, the additional waypoints must be loaded in flight by writing over any desired WP1-WP5 data positions.

After all desired data are entered, the INP button is pushed to turn off its light and exit the input mode of apparatus 11. At that time, the buttons of panel 40 indicate which waypoint and quantities are shown on the LED displays. For the selected waypoint illuminated on panel 40, LED display 32 shows either Heading or Bearing (depending on which button, HDG or BRG, is illuminated), and LED display 30 shows Frequency, Speed, or Range.

As the above information is input, a signal representative of each piece of information is generated by keyboard 14 and I/O decoder 18 and stored in RAM 16.

B. Operation In Flight

Prior to takeoff, the VOR, BRG, and FRQ buttons are pressed. When their lights are on, the VOR receiver must be tuned to the frequency indicated on display 30 by either the pilot or an automatic tuning device (not shown) connected to the VOR receiver and apparatus 11.

After takeoff, when the VOR signal is acquired, LED display 32 shows the value of aircraft's bearing to the VOR. At that time, WP1 is pressed to select the first waypoint, and buttons HDG and RNG are pressed to display the heading and range to WP1. LED display 32 shows the heading command, and LED display 30 shows the range to the waypoint. The aircraft is then turned to within 5 degrees of the displayed heading by the pilot or automatic heading equipment (not shown) attached to apparatus 11.

Once in operation, apparatus 11 automatically updates RNG every 30 seconds and samples bearing to the VOR signal to update SPD and HDG every minute. Although RNG is normally displayed on display 30, current ground speed may be displayed instead by pressing the SPD button.

When waypoint 1 is reached, waypoint 2 is selected by pushing the WP2 button, allowing system access to signals representative of the previously entered WP2 heading, bearing, range, speed and frequency which are stored in RAM 16. If an alternate waypoint is desired, the INP button is pressed, and alternate waypoint data is entered as described above.

If WP2 is selected, the FRQ button is also pushed to display the frequency of the preselected VOR near to WP2, and the VOR receiver is tuned in the manner described above to the frequency indicated on display 30. Then the BRG and RNG buttons are pressed so that the earlier estimated heading command and range to WP2 are shown on LED displays 32, 30, and the aircraft is turned as described above to within 5 degrees of the displayed heading. Apparatus 11 continues to automatically update the displayed RNG every 30 seconds and BRG every minute.

While in flight, the operation of the area navigation apparatus 11 enables a reliable monitoring and update of the range and bearing to the desired waypoint, by generating a reliable estimate of the range to the VOR using various filtering operations.

In this system, range to VOR is not directly measured, but is instead estimated and filtered to ensure the reliability of the estimate. A range evaluation filter is used to determine which set of assumptions should be trusted. Specifically, the range to VOR is provisionally estimated in two ways. In the first it is generated with the present course and an updated bearing, and thus the first provisional estimate does not depend on the accuracy of the past bearing samples or ground speed. In the second estimate, range is generated by examining the ground speed and the change in past and present bearing samples, without assuming that the aircraft's course corresponds to the heading to the waypoint.

Because of the uncertainties with which bearing, range and ground speed currently may be measured or estimated, I have found that certain filters improve the system's performance by smoothing out the samples and estimates generated from the bearing samples. Unnecessary heading changes which would cause the aircraft to respond to VOR bearing changes due to becaon noise are thus reduced. Specifically, I have found that linear filters are best used to smooth changes in velocity and range to the waypoint and trap filters are best used to smooth changes in bearing and heading.

Figure 10:
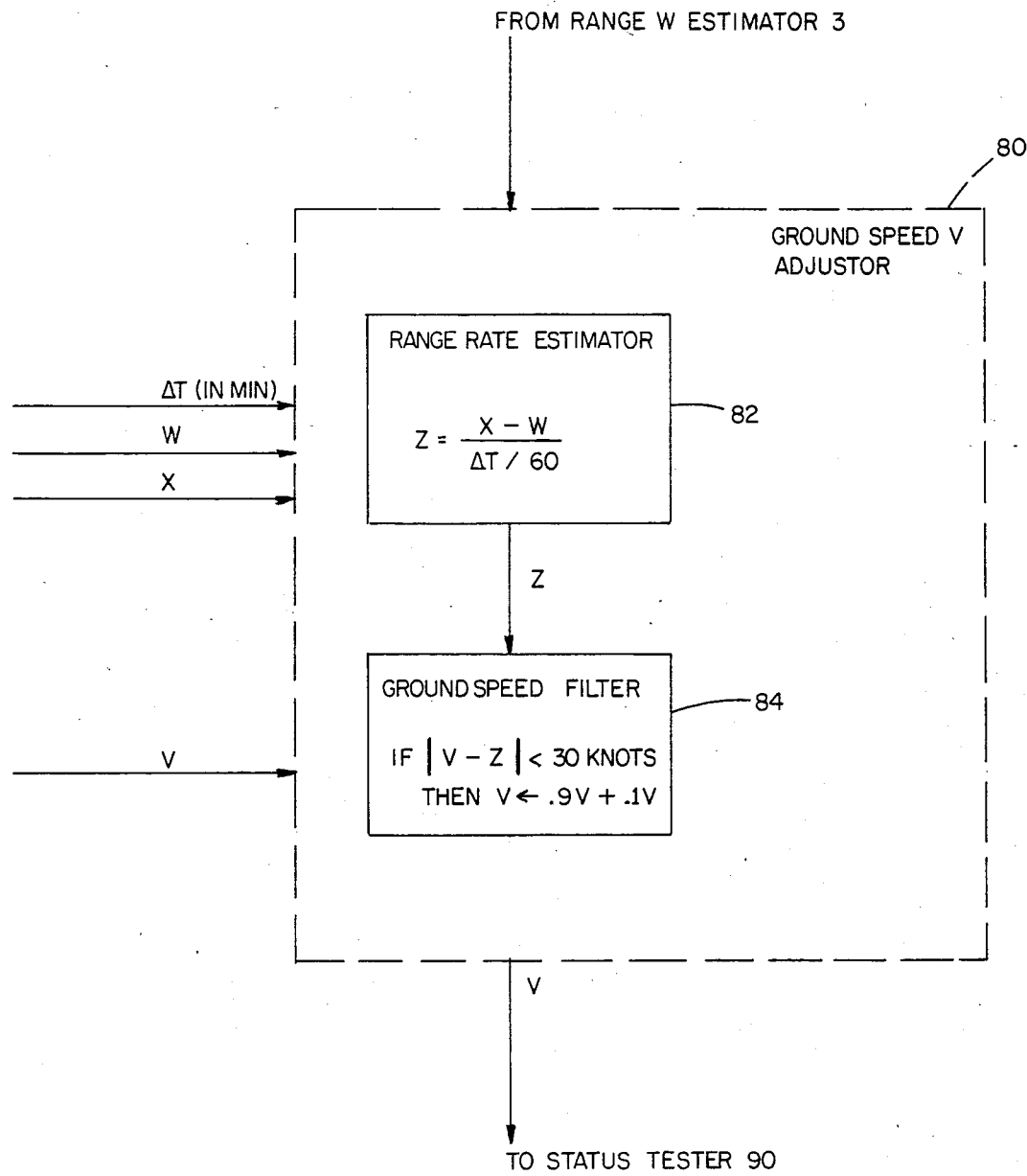

A linear filter is one that accepts fixed fractions of one or more input values and generates a weighted composite of the input values. One such linear filter is shown in FIG. 10, generating a ground speed estimate. A trap filter is one that determines whether a sensor value lies within some reasonable criteria. The range evaluation filter described above is a trap filter; it determines whether the difference between the two range estimates is low; i.e. less than 2 nautical miles. If it is not, the estimate based on change in bearing is selected.

Filter design determines to a large extent the iteration rate of the area navigation system; i.e., a rapid update rate is too responsive to bearing noise, while an overly slow sample and update rate results in excessive position errors (a zig-zagging flightpath). Preferably, updating should be performed at intervals of between one second and two minutes, depending on the aircraft speed and the criticality of position errors. The faster the plane or the more critical the position error, the faster updates should be performed. For light aircraft cruising at about 200 knots, I have found the most preferable rate for sampling the VOR bearing is about once a minute, and for updating the range to the waypoint is about every 30 seconds.

Figure 5:
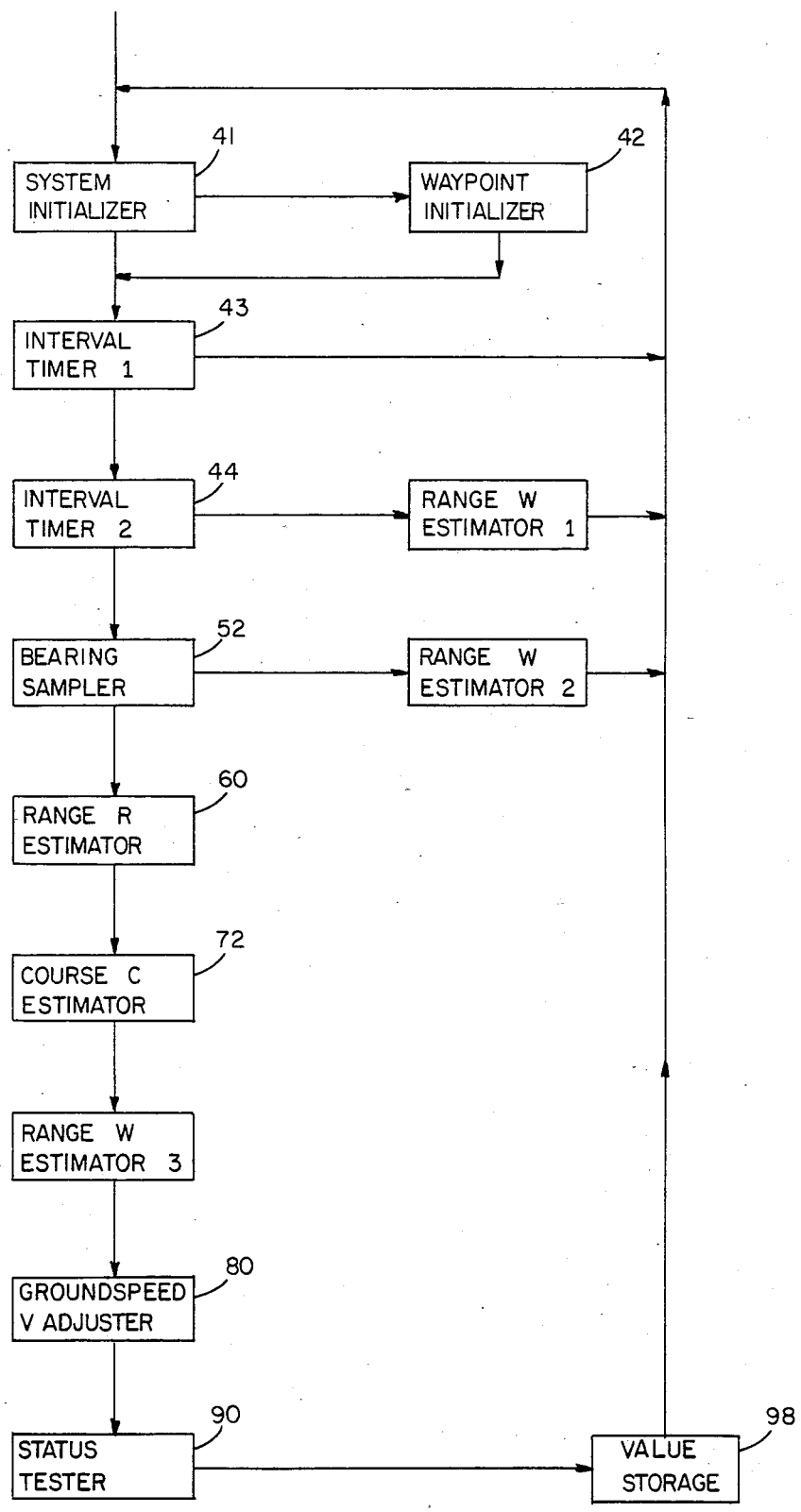
FIG. 5 is an overview diagram, showing general control routines of the present invention.

Turning now to FIG. 5, which shows diagrammatically the operation of apparatus 11, interval timers 43, 44 activate range W generator 1 to update the range to the waypoint every 30 seconds and to activate the bearing sampler 52 once a minute. If the sampled bearing value is less than two degrees different from the last previous sampled bearing value, sample 52 discards the present sample and activates range W generator 2. Control is once again passed to the System Initiator 41.

If the sample is not discarded, control is transferred to Range R Estimator 60, which estimates the range to VOR and transfers control to Course C Estimator 70. Estimator 70 generates a provisional heading, tests it and if necessary, updates the heading command and transfers control to Range W Estimator 3, which updates range to the waypoint. Control is then transferred to ground speed V adjuster 80, which then transfers control to status tester 90, which determines which of status lights 34, 36, 38 will be illuminated. In value storage 98, the present bearing sample, time of sampling, range to waypoint, and provisional heading command are stored to be used in the next iteration of the process. At that point, heading and range values are transferred to I/O decoder 18 and control is transferred to system initializer 41 to begin the next iteration.

Figure 6:
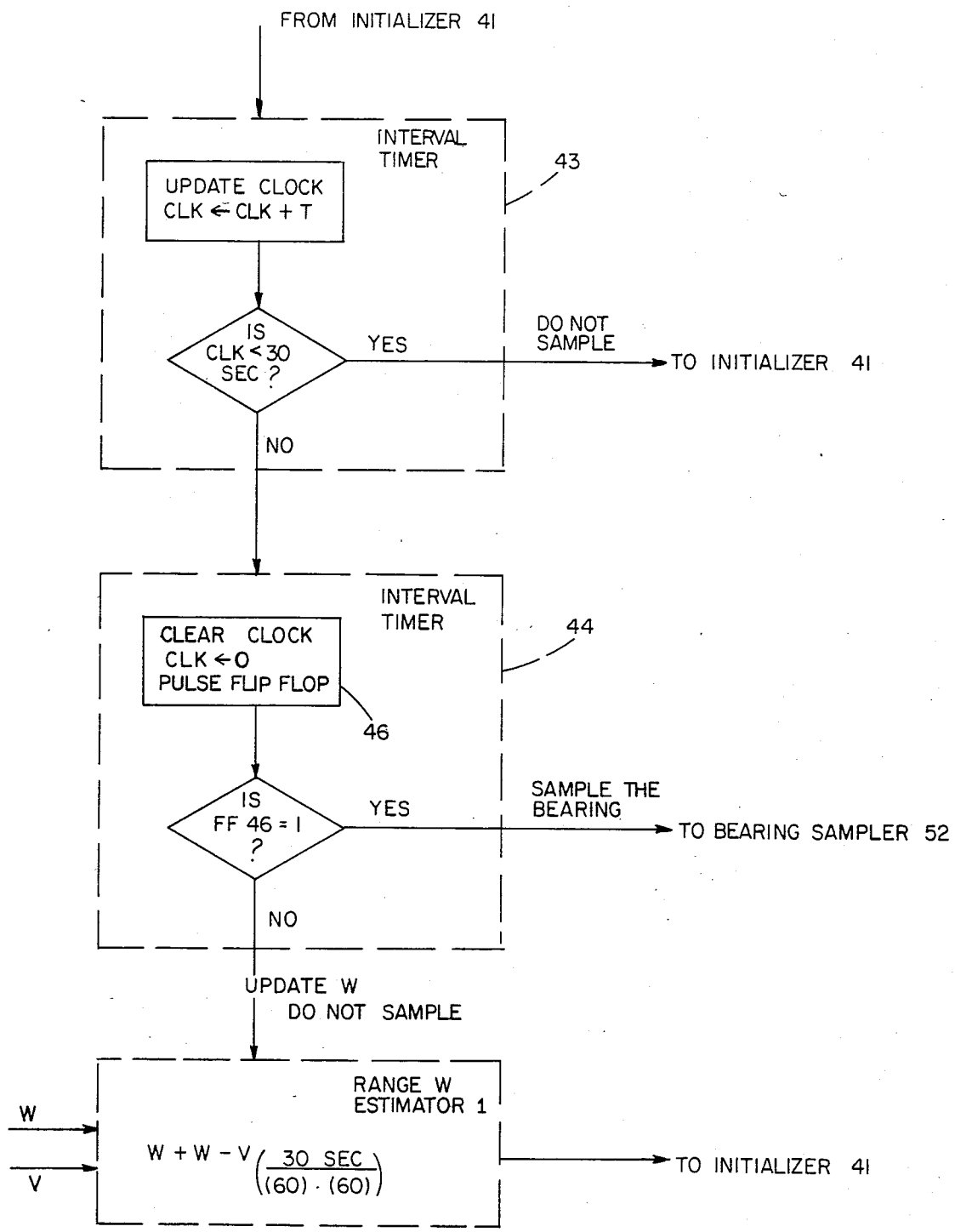

As shown in FIG. 6, the update and sample timing is controlled by interval timers 43 and 44. Interval timer 43 updates sample clock (CLK) by $T_c$, the amount of time in seconds that has elapsed since timer 43 was last activated. When CLK reaches 30 seconds, interval timer 44 is activated.

Every other time that timer 44 is activated (i.e. every 30 seconds), range W to the waypoint is updated by range W estimator 1, which returns control to system initializer 41. When W is not so updated, timer 44 transfers control to bearing sampler 52.

Specifically, upon activation, timer 44 clears CLK and pulses its toggle flipflop 46. When toggle flipflop 46 is "0", timer 44 transfers control to range W estimator 1, which subtracts from present range W the product of ground speed V and 30 seconds (represented as a fraction of an hour). When flipflop 46 is "1", timer 44 transfers control to bearing sampler 52 which samples the VOR bearing. Timer 44 then transfers control to either range W estimator 2 or 3, as determined by filter 58 (described below).

Figure 7:
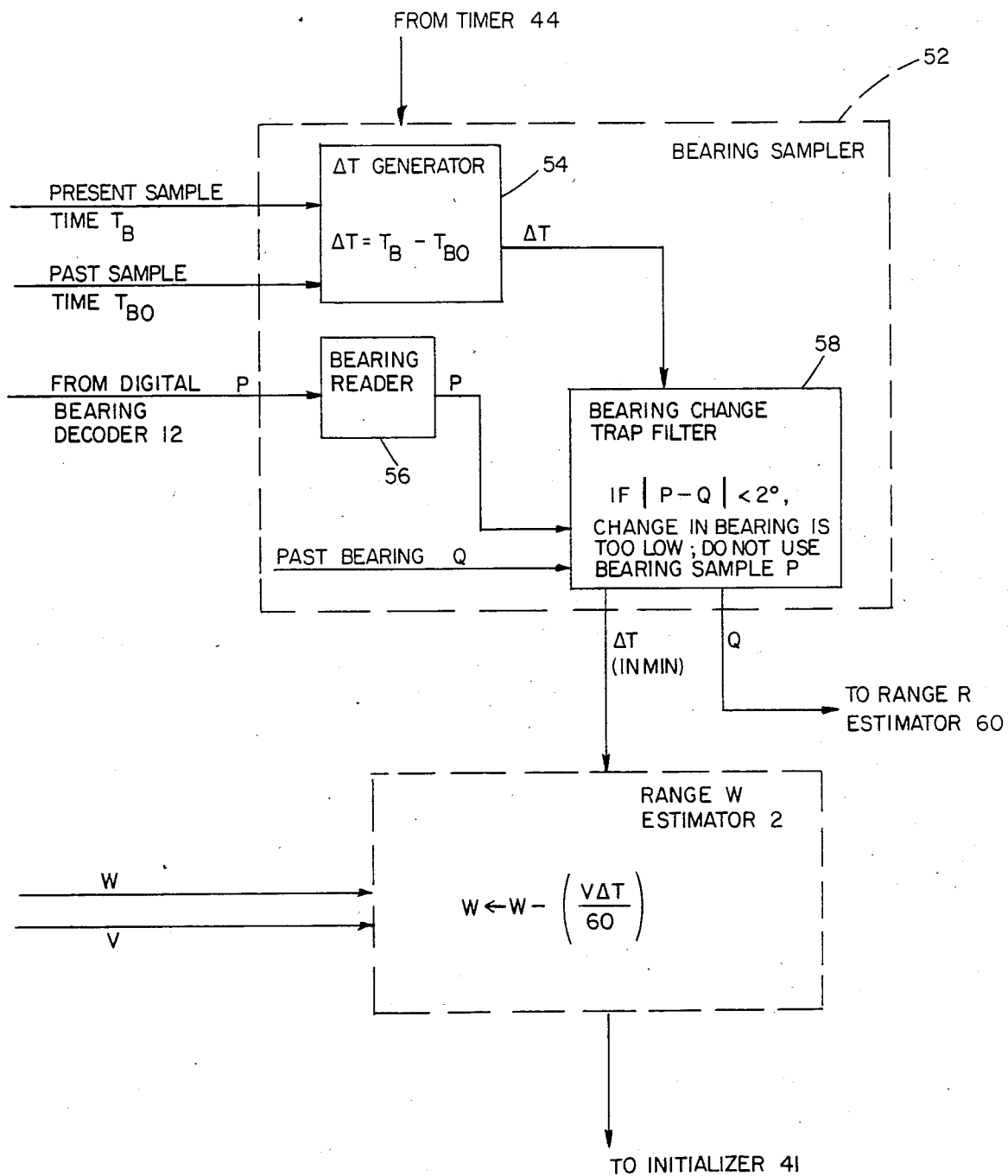

As seen in FIG. 7, bearing sampler 52 has $\Delta T$ generator 54, which accepts present sample time $T_B$ and past sample time $T_{BO}$, and generates $\Delta T$, the time (in seconds) between sampling. Bearing reader 56 accepts input from digital bearing decoder 12, and feeds it into bearing change trap filter 58, where it is compared to the last previous bearing sample Q.

Figure 8:
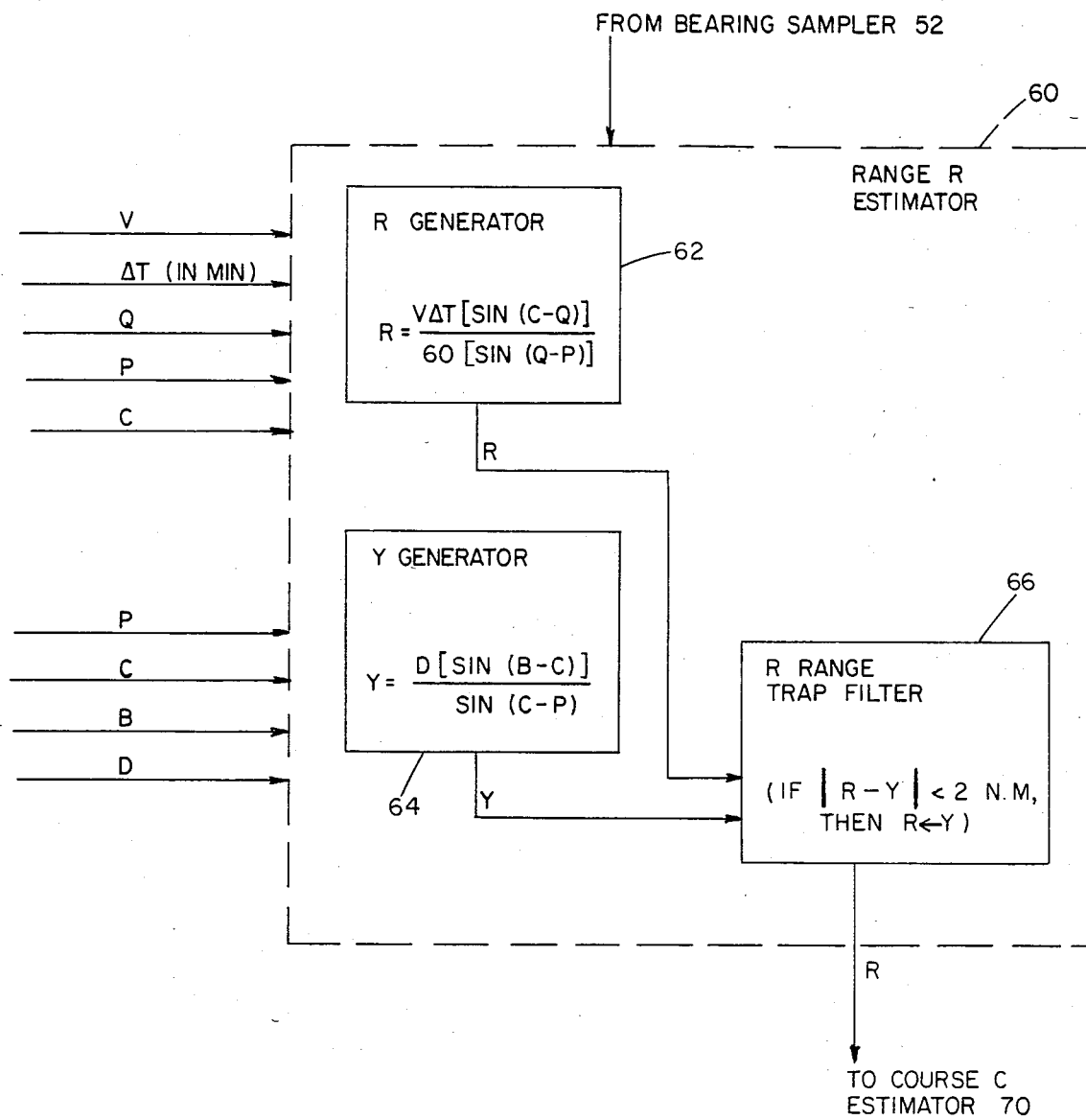
Figure 9:
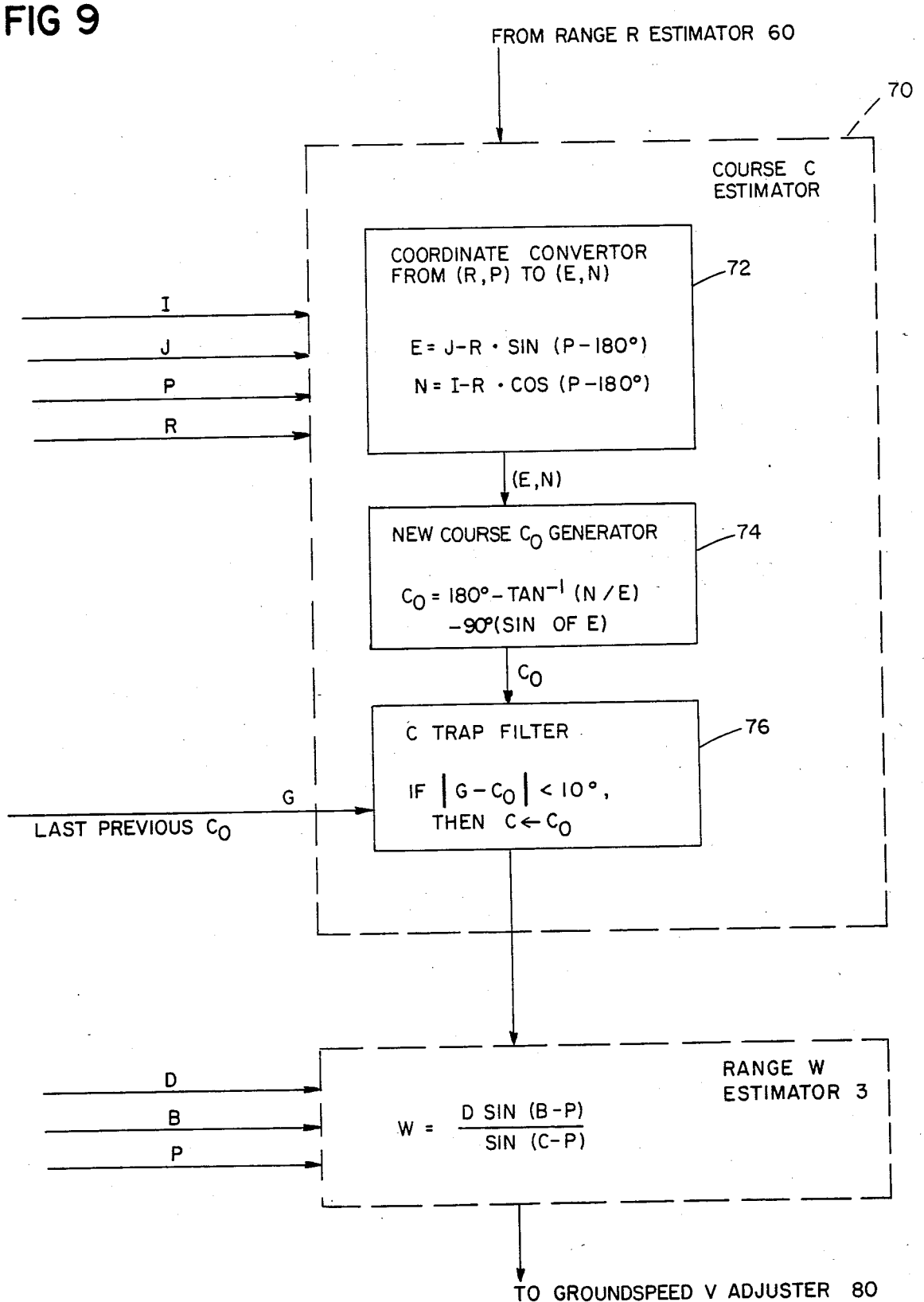

Filter 58 determines whether the bearing change from Q to P is large enough to be provide a valid measurement. We have found, through trial and error, that where the absolute value of the bearing change, $|P-Q|$, is less than two degrees, the change in bearing is not sufficient to merit update. Those experimental results generally conform to the fact that VOR bearing information is not accurate to less than one degree. If $|P-Q|<2$, control is transferred to range W estimator 2, which multiplies ground speed V by $\Delta T$ (converted to hrs) and subtracts the product from range W. Range W thus updated, control is then transferred to initializer 41. If $|P-Q|\geq 2$, bearing sampler 52 transfers control to Range R estimator 60, as seen in FIG. 8.

Range R estimator 60 generates alternate provisional range values R and Y, and, using Trap Filter 66, selects one to be used to update the range to VOR. R and Y are based on trigonometric properties as expressed in navigational triangles, shown in FIGS. 3 and 4.

Figure 3:
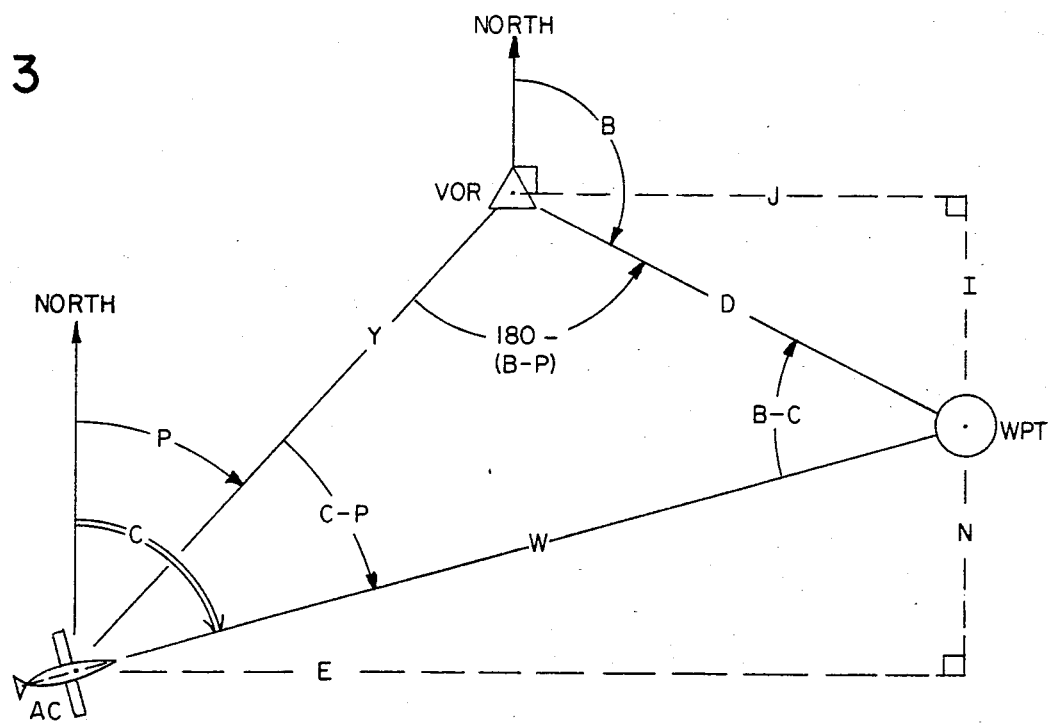
FIG. 3 is a diagram of a navigational triangle employed by the present invention.

FIG. 3 shows a triangle, having as vertices the aircraft (AC), the VOR beacon (VOR) and the desired waypoint (WPT). In (X,Y) coordinate space, the distance between VOR and WPT is (J,I), while the distance between AC and WPT is (E,N). In FIG. 3:
Y = estimated range between AC and VOR;
D = known range between VOR and WPT;
W = estimated range between AC and WPT;
P = present AC bearing to VOR;
B = known bearing from VOR to WPT; and
C = present course from AC to WPT (Heading command).

Figure 4:
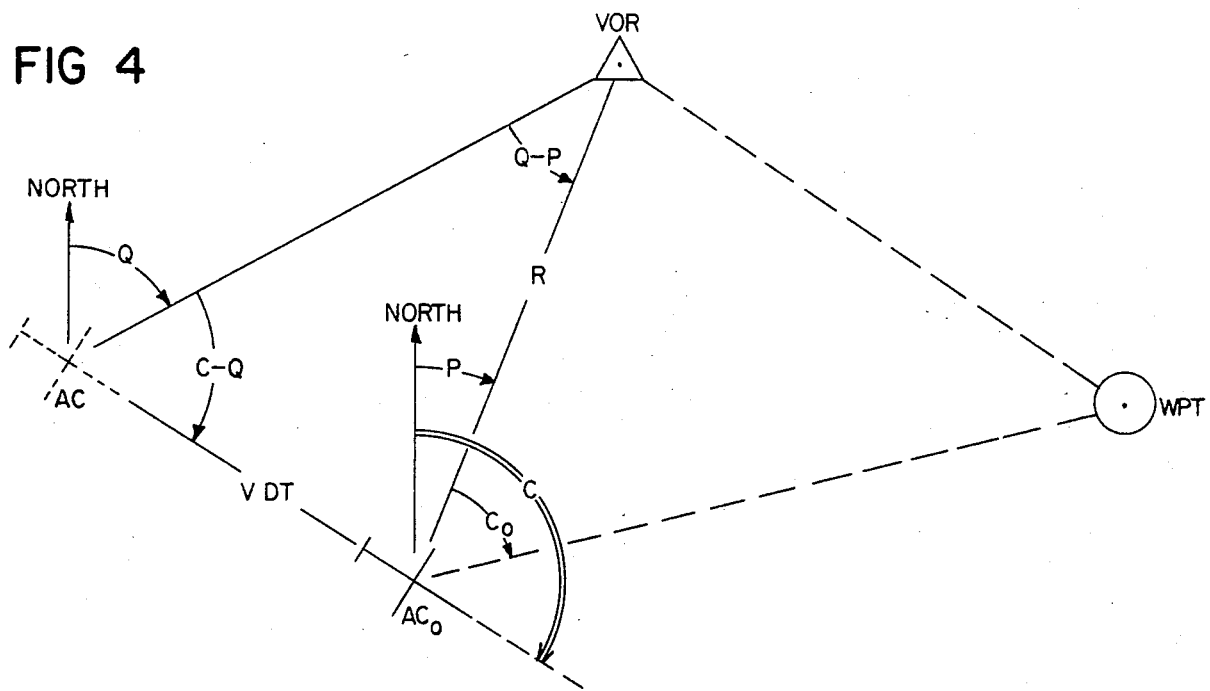
FIG. 4 is a second diagram of a navigational triangle.

FIG. 4 is a diagram of another navigation triangle, having as vertices the past location of the aircraft (AC), the present location of the aircraft ($AC_o$), and the VOR beacon (VOR). In FIG. 4,
R = range between VOR and present location $AC_o$;
$V\Delta T$ = range between AC and $AC_o$, where
  V = aircraft ground speed, and
  $\Delta T$ = time difference between past and present bearing readings;
Q = past bearing to VOR;
P = present bearing to VOR;
C = past course heading, and
$C_o$ = present course heading.
From the law of sines, in FIG. 3, $$\frac{D}{SIN(C-P)} = \frac{Y}{SIN(B-C)} = \frac{W}{SIN(B-P)}$$

Since the values of D and B may be determined from a navigational map, P is the new bearing sample, and W has been calculated, then, assuming present course C is correct, the range to VOR may be derived:

$$Y = \frac{D[SIN(B-C)]}{SIN(C-P)}.$$

Similarly, in FIG. 4, from the law of sines, $$\frac{R}{SIN(C-Q)} = \frac{V\Delta T}{SIN(Q-P)}$$

Therefore, given C, P, V, $\Delta T$, and past bearing sample Q, one can calculate the value of R:

$$R = \frac{V\Delta T[SIN(C-Q)]}{SIN(Q-P)}.$$

As seen in FIG. 8, range R estimator 60 has an R generator 62, a Y generator 64, both of which use the law of sines to generate, respectively, R and Y.

Trap filter 66 compares the provisional range values R and Y and selects one to be adopted as the R estimate for updating estimated ground speed, and the course and range to WPT. Through trial and error, it has been determined that, so long as the absolute value of the difference between R and Y is less than between one and three nautical miles, and most preferably less than two nautical miles, an assumption may be made that the existing course estimate C is accurate. Therefore, since Y generator 64 determined the provisional value of R based on that assumption, trap filter 66 adopts Y as the current estimated provisional range to VOR for updating the course and range to waypoint.

If $|R-Y|\geq 2$ nautical miles, it is not safe to assume that present course to WPT is correct. Trap filter 66 then adopts R, which is based on estimated ground speed, as the estimated provisional range to VOR.

Once a provisional value for the range to the VOR has been selected, control passes to course C estimator 70, where a provisional heading to the waypoint is derived without additional reliance on existing ground speed or course estimates.

Course C estimator 70 has coordinate converter 72, which expresses the distance from the aircraft to the waypoint in X, Y coordinates, to be called (E,N).

To do so, it uses the distance between VOR and WPT expressed as X, Y coordinates (J,I), which were generated by apparatus 11 when the bearing B and range R from VOR to WPT were determined from a navigation map and inputted during waypoint initialization.

New course $C_o$ generator 74 then uses (E,N) to generate a provisional heading command between the aircraft's present position and the waypoint. Control is then passed to $C_o$ trap filter 76, which determines whether to use provisional heading $C_o$ in updating course C. Filter 76 determines the difference between $C_o$ and G, the provisional heading established by the apparatus 11 as a result of the most recent previous VOR sampling Q.

If $C_o$ and G are not sufficiently close (preferably 5 to 20 degrees), heading command C is not updated based on bearing sample P. Most preferably, if the absolute value of $C_o - G$ is not less than ten degrees, i.e., if $|G-C_o|$ is greater than or equal to 10°, then $C_o$ does not replace C. If $|G-C_o|$ is less than 10 degrees, then G is adopted as an update of C.

Filter 76 thus accepts a large change in heading command only if one provisional heading command demonstrating the large change is verified by a second sampling which results in a similarly changed heading command. Since G was a provisional heading (one that was not necessarily accepted as an update for C), filter 76 provides a mechanism for altering heading command C when apparatus 11 generates two similar provisional heading commands in a row. Therefore, if an aircraft veers off course or finds itself lost, filter 76, after generating two similar provisional heading commands in a row, provides a heading command that will return a plane on course.

Having updated the heading, control is transferred to range W estimator 3, which then generates the range to the waypoint by deriving W using the law of sines and the triangle of FIG. 1: i.e.

$$W = \frac{D[\mathrm{SIN}(B - P)]}{\mathrm{SIN}(C - P)}$$

Control is transferred then to ground speed V adjustor 80, which updates the ground speed V using the newly generated value W. Adjuster 80 has range rate estimator 82, which accepts ΔT, present range W and X (the last previous range to waypoint), and generates the provisional ground speed estimate, range rate Z.

Ground speed filter 84 then determines whether current ground speed V is much larger or smaller than the range rate Z. If it is not, a linear filter updates V to avoid fluctuations in ground speed which would make the system unacceptably unstable. If it is much larger, filter 84 does not update V.

Filter 84 includes a trap filter which determines whether the difference between range rate Z and ground speed V is less than 30 nautical miles/hour. If so, it updates V by weighting ground speed V and range rate Z. I have found a filter which improves responsiveness and accuracy in area navigation such as linear filter 84 which weights V by 0.9 and Z by 0.1. Updating ground speed in this manner allows adjustments for wind and other factors that can affect ground speed.

A final check on the operation of the area navigation system is provided by passing control status tester 90, which controls status lights 34, 36, 38 on display and keyboard 14. Specifically, status tester 90 uses status initializer 92 and trap filters 94, 96 to evaluate the updated course and ground speed. If the range rate estimate Z varies from the ground speed estimate V by more than 100 nautical miles/hour, trap filter 94 causes the illumination of yellow keyboard status light 36 to indicate the unreliability of the ground speed value being displayed on LED Display 30.

A more serious problem concerns a potential failure of the provisional heading command $C_o$. If $C_o$ varies from the last previous heading estimate G by more than 45 degrees, filter 96 causes the illumination of red status light 34, indicating the unreliability of the past two sets of provisional heading commands. In such a situation, if the pilot follows the last acceptable heading commmand for a few minutes, apparatus 11 reads more bearing samples and automatically corrects the heading commands, as described above.

As seen in FIG. 11, status initializer 92 starts the test by setting ST to the value 1. Thus, at the beginning of the status test, current heading and range values to the waypoint are assumed to be acceptable. Control is transferred to status trap filter 94, which determines whether range information is accurate. Status trap filter 94 accepts V and Z; if the absolute value of V−Z is equal to or greater than 100 nautical miles/hour, groundspeed and provisional ground are not sufficiently close. Therefore, range information is not accurate; filter 94 changes ST to 0. Otherwise ST remains unchanged.

Control is transferred to trap filter 96, where G and $C_o$ are compared to determine whether course information is unreliable. If $|G - C_o| > 45°$, one or both of the last two sets of bearing information are not reliable, and filter 96 changes ST to −1.

Control is then passed to Value Storage 98 where past sample values G, X, Q, and $T_{BO}$ are replaced by current values $C_o$, W, P, and $T_B$ in RAM 16. C, W, P, R, and ST are transferred to I/O decoder 18 for display on display and keyboard 14. After that, control is passed to System Initializer 41 to begin another system iteration.

The system values are shown on display and keyboard 14 in the manner described above. The general status of the system is displayed on display 14 by illuminating one of status lights 34, 36, 38 in response to the value of ST. Specifically, decoder 18 accepts the value of ST and uses it to send control signals to status lights 34, 36, 38 on display and keyboard 14. When ST=−1, decoder 18 sends signals to display and keyboard 14 to turn on red status light 34. When ST=0 decoder 18 sends signals to turn on yellow status light 36. When ST=1, decoder 18 sends signals to turn on green status light 38.

When red status light 34 is lit, then neither course nor range-to-waypoint values are reliable. In that case, the aircraft follows the last reliable heading command for the next two or so minutes until the system collects a few more bearing samples and generates a reliable heading command to the waypoint.

Red Status light 34, which is also illuminated when apparatus 11 initially is powered on, remains illuminated until sufficient data are collected to begin navigation (normally, approximately two to five minutes of data collection are sufficient). Typically, within one minute, Yellow Status Light 36 comes on, indicating that the Heading Command (HDG) on display 32 is reliable, but that range-to-go (RNG) on display 30 is not yet reliable. The aircraft should be turned so its heading matches the heading command (shown in LED display 32) to within about 5 degrees. Within two minutes, the Green Status light 34 comes on, indicating both Heading Command and Range-to-Go, as seen on displays 32, 30 are reliable.

Other embodiments are within the following claims.

I claim:

1. Apparatus for air navigation to a point of known location which is separated from a VOR beacon of known location, said apparatus comprising:

a storage means for storing signals representative of, respectively, the known locations of said point and said VOR, an estimated ground speed, an estimated range-to-go to said point, and an estimated course to said point;

means for receiving from a VOR signal receiver/VOR bearing generator a signal representative of the current bearing of said VOR beacon from said apparatus;

a bearing change generator responsive to signals generated by said VOR receiver/generator for generating a signal that is representative of the change in the VOR bearing;

a course estimator responsive to signals generated by said bearing change generator and signals in said storage means for generating a signal representative of an updated course heading, said course estimator including, (a) a first provisional range-to-VOR generator responsive to signals representative of the current estimated course heading and the current VOR bearing for deriving a signal representative of a provisional range-to-VOR, (b) a second provisional range-to-VOR generator responsive to signals representative of the current estimated ground speed and the change of the VOR bearing for deriving a signal representative of a provisional range-to-VOR, (c) a range filter for comparing the relationship between said signals representative of said provisional ranges-to-VOR with a predetermined permitted relationship and selecting one of said two signals representative of provisional ranges-to-VOR on the basis of said comparison, (d) a provisional course generator responsive to the signal representative of the one of said provisional ranges-to-VOR selected on the basis of said comparison for generating a signal representative of a provisional course, and (e) a course updater responsive to said signal representative of said provisional course for generating a signal representative of an updated course;

a range-to-point estimator responsive to said signal representative of said updated estimated course stored in said storage means for generating a signal representative of the range-to-point, and control means for controlling said bearing sampling and for activating said course estimator at predetermined intervals.

2. The apparatus of claim 1 wherein said predetermined intervals are between one second and two minutes.

3. The apparatus of claim 1 wherein said range filter comprises selecting means for selecting the value of said second range-to-VOR estimate whenever the value of said first estimate is inconsistent with the value of said second estimate according to a preestablished consistency test.

4. The apparatus of claim 3 wherein said range filter selection means comprises comparison means for comparing the values of the first and second provisional VOR ranges generated by said provisional VOR range generators, and selecting said second provisional value whenever the absolute value of the difference between them exceeds a predetermined distance of between one and three nautical miles.

5. The apparatus of claim 1 wherein said storage means stores signals representative of a past provisional estimated course and said course updater further comprises a course evaluation filter for comparing said signals representative of said current and said past provisional courses with a predetermined permitted relationship and updating said signal representative of said current estimated course.

6. The apparatus of claim 5 wherein said predetermined number is between 5 and 20 degrees.

7. The apparatus of claim 1 further comprising a ground speed estimator for updating said value of said ground speed using signals representative of said updated range to said point.

8. The apparatus of claim 7 wherein said ground speed estimator comprises
a provisional ground speed generator which generates a signal representative of the provisional rate of change in the range to said point responsive to said signal representative of said updated range to said point, and
a ground speed filter which generates a signal representative of a value for an updated ground speed responsive to said signal representative of the provisional ground speed and said stored signal representative of said estimated ground speed.

9. The apparatus of claim 1 further comprising a output means for outputting a value representative of said updated course heading to an automatic-pilot means for maintaining said aircraft on said updated course heading.

10. In a method of air navigation to a point of known location which is separated from a VOR beacon of known location, said method comprising providing data signals representative of, respectively, the known location of said known point and said VOR, an estimated ground speed, an estimated range-to-go to said point, and an estimated course to said second point, that improvement comprising:

updating the value for the current estimated heading to said point repeatedly, at predetermined intervals, by (a) deriving a data signal representative of a first estimate of the range to the VOR from a data signal representative of the current estimated heading to said point and a data signal representative of the current bearing to the VOR, and (b) sampling signals representative of the current bearing of the VOR beacon, and, after sampling, generating a data signal representative of the current bearing to the VOR beacon and a data signal representative of the rate of change of that bearing, (c) filtering said data signal representative of said first estimate of the VOR range by deriving a data signal representative of a second estimate of the VOR range and comparing said data signal representative of said first estimate to said data signal representative of the value of said second estimate, said data signal representative of the value of said second estimate being derived from said stored data signal representative of the current estimated ground speed and said data signal representative of the change of the bearing to VOR, and (d) deriving a data signal representing the value of a provisional course heading to the point from the data signal representative of said filtered range to the VOR;

generating a data signal representative of a reevaluated course heading using said data signal representative of said selected provisional heading; and generating a data signal representative of the value of an updated range-to-go to said second waypoint using the a data signal representative of said updated course heading.

11. The method of claim 10 wherein said predetermined intervals are between one second and two minutes.

12. The method of claim 10 wherein said filtering step comprises selecting said data signal representative of said second VOR range estimate whenever the data signal representing said first estimate is inconsistent with the data signal representing said second estimate according to a preestablished consistency test.

13. The method of claim 12 wherein said consistency test comprises comparing the absolute value of the difference of said data signals representative of said first and second estimates to a predetermined data signal representative of a distance of between one and three nautical miles.

14. The method of claim 10 wherein a data signal representative of said provisional heading is used to replace said stored data signal representative of the current estimated heading only if the difference between the data signal representative of the current provisional heading and the stored data signal representative of the most recent previous provisional heading is less than a data signal representative of a predetermined number of degrees.

15. The method of claim 14 wherein said predetermined number is between 5 and 20 degrees.

16. The method of claim 10 wherein a data signal representative of said updated range to said point is used to reevaluate the data signal representative of said current estimated ground speed.

17. The method of claim 16 wherein said reevaluation of said estimated ground speed comprises deriving a data signal representative a provisional rate of change in the range-to-go to said known point using data signals representative of the current range-to-go and the most recent previous range-to-go, and filtering a data signal representative of said current estimated ground speed using said provisional rate of change in the range-to-go to said waypoint.

18. The method of claim 10 further comprising outputing a data signal representative of said updated course heading to an automatic pilot means for maintaining said aircraft on said course heading.

19. Apparatus for air navigation to a point which is separated from a VOR beacon by a known amount, said apparatus comprising:

a storage means for storing signals representative of, respectively, the coordinate locations of said point and said VOR, an estimated ground speed, an estimated range-to-go to said point, and an estimated course to said point;

a receiving means for receiving from a VOR signal receiver/VOR bearing generator a signal representative of the current bearing of said VOR beacon from said apparatus;

a bearing change generator responsive to signals generated by said VOR receiver/generator for generating a signal that is representative of the change in the VOR bearing;

a coordinates estimator responsive to signals generated by said bearing change generator and signals in said storage means for generating signals representative of coordinates of said point with respect to present location of said apparatus said coordinates estimator including, (a) a first provisional range-to-VOR generator responsive to signals representative of the current estimated course heading and the current VOR bearing for deriving a signal representative of a provisional range-to-VOR, (b) a second provisional range-to-VOR generator responsive to signals representative the current estimated ground speed and the change of the VOR bearing for deriving a signal representative of a provisional range-to-VOR, (c) a range filter for comparing the relationship between said signals representative of said provisional ranges-to-VOR with a predetermined permitted relationship and selecting one of said two signals representative of provisional ranges-to-VOR on the basis of said comparison, (d) a provisional first coordinate generator responsive to said signal representative of said selected range-to-VOR for generating a signal representative of a provisional estimate of one of said coordinates of said point with respect to said apparatus, (e) a first coordinate updater responsive to said signal representative of said provisional first coordinate estimate for generating a signal representative of an updated first coordinate, (f) a second coordinate estimator responsive to said signal representative of said updated first coordinate for generating a signal representative of the other of said range and course coordinates; and control means for controlling said bearing sampling and for activating said range and course coordinates estimator at predetermined intervals.

* * * * *